United States Patent
McEwen et al.

(10) Patent No.: US 8,634,797 B2
(45) Date of Patent: Jan. 21, 2014

(54) EMERGENCY COMMUNICATION DEVICE

(75) Inventors: Colin Dougal McEwen, Berkshire (GB); Robert Edward Banks, Berkshire (GB); Alex Tame, Berkshire (GB)

(73) Assignee: Vodafone Group PLC, Newbury, Berkshire (GB)

( * ) Notice: Subject to any disclaimer, the term of this patent is extended or adjusted under 35 U.S.C. 154(b) by 89 days.

(21) Appl. No.: 13/054,282

(22) PCT Filed: Jul. 13, 2009

(86) PCT No.: PCT/GB2009/050841
§ 371 (c)(1),
(2), (4) Date: Mar. 16, 2011

(87) PCT Pub. No.: WO2010/007412
PCT Pub. Date: Jan. 21, 2010

(65) Prior Publication Data
US 2011/0159839 A1 Jun. 30, 2011

(30) Foreign Application Priority Data

Jul. 15, 2008 (GB) .................................. 0812855.5

(51) Int. Cl.
*H04M 11/04* (2006.01)
(52) U.S. Cl.
USPC ............... 455/404.1; 455/404.2; 455/414.1; 455/456.1; 455/456.3; 455/558; 379/45
(58) Field of Classification Search
USPC .......... 455/404.1, 404.2, 414.1, 456.1, 456.3, 455/558; 379/45
See application file for complete search history.

(56) References Cited

U.S. PATENT DOCUMENTS

| 5,563,931 | A | 10/1996 | Bishop et al. ................... 379/59 |
| 6,374,099 | B1 * | 4/2002 | Bi et al. ..................... 455/404.1 |
| 6,745,043 | B1 | 6/2004 | Lester et al. .................. 455/512 |
| 7,697,935 | B2 * | 4/2010 | Guyot et al. .................. 455/443 |
| 8,027,445 | B2 * | 9/2011 | Ku et al. ................... 379/201.02 |

(Continued)

FOREIGN PATENT DOCUMENTS

| JP | 2005-328406 | 11/2005 |
| WO | WO 97/16931 | 5/1997 |

(Continued)

OTHER PUBLICATIONS

European Search Report dated Nov. 10, 2008.

*Primary Examiner* — Olumide T Ajibade Akonai
(74) *Attorney, Agent, or Firm* — Kratz, Quintos & Hanson, LLP

(57) ABSTRACT

A mobile terminal configured for use in a mobile telecommunications network, the mobile terminal having an emergency notification facility and an identifier, the identifier usable by the network to recognize the mobile terminal as having the emergency notification facility and to change a system access priority for the terminal, where required. Preferably, the terminal also includes a sensing means configured to determine when the mobile terminal is in motion and/or associated with a vehicle and notify the network of such, in order to allow the network to change the system access priority based upon whether or not the terminal is in motion and/or associated with a vehicle. In this regard, mobile terminals with an emergency notification facility, particularly when moving or in a vehicle, are given a higher priority so that an emergency call can be quickly dispatched in the event of an accident.

13 Claims, 2 Drawing Sheets

(56) References Cited

U.S. PATENT DOCUMENTS

| | | | |
|---|---|---|---|
| 2004/0029592 A1 | 2/2004 | Shyy et al. | 455/453 |
| 2005/0227666 A1* | 10/2005 | Cheng | 455/404.1 |
| 2006/0258328 A1 | 11/2006 | Godoy | 455/404.1 |
| 2007/0049201 A1* | 3/2007 | Nagano et al. | 455/63.2 |
| 2007/0143613 A1* | 6/2007 | Sitch et al. | 713/171 |
| 2007/0155362 A1 | 7/2007 | Davis | 455/404.1 |
| 2007/0185646 A1* | 8/2007 | Neugebauer et al. | 701/201 |
| 2008/0009262 A1* | 1/2008 | Rudolf et al. | 455/404.1 |
| 2008/0165737 A1* | 7/2008 | Uppala | 370/331 |
| 2009/0196269 A1* | 8/2009 | Agarwal et al. | 370/341 |

FOREIGN PATENT DOCUMENTS

| | | |
|---|---|---|
| WO | WO 03/067913 | 8/2003 |
| WO | WO 2007/072176 | 6/2007 |
| WO | WO 2008/083928 | 7/2008 |
| WO | WO 2008/096162 | 8/2008 |

* cited by examiner

EMERGENCY COMMUNICATION DEVICE

FIELD OF THE INVENTION

The present invention relates to an emergency communication device and a method of operating such a device. More particularly, the present invention relates to an emergency communication device configured for operation in a vehicle and a method of operating such a device in a mobile communications network.

BACKGROUND TO THE INVENTION

As part of the European Union (EU) eSafety initiative, it is expected that all new cars sold in the EU from 2009 onwards will be fitted with an "eCall terminal". An eCall terminal is a device configured to generate an emergency call either manually by a vehicle occupant or automatically via activation of in-vehicle sensors when an accident occurs. When activated, the eCall device establishes an emergency voice call to a Public Safety Answering Point (PSAP), which is typically a regulated public authority or a private centre that operates with the authorisation of a relevant public authority. At the same time, data regarding the accident is sent to the PSAP operator receiving the call.

Further details on how eCall is intended to operate are provided at http://europa.eu/scadplus/leg/en/lvb/l31103a.htm.

Since it is proposed that eCall terminals will be incorporated into all new cars sold in the EU, it is expected that their deployment will be costly.

A further disadvantage of eCall devices is that they do not provide an instantaneous emergency notification, since they are currently configured to only be activated when an air bag is deployed. At all other times, when not required, the devices are deactivated. Therefore, in the event of an accident, an in-vehicle sensor will be triggered, and the eCall device in turn activated. Upon activation, it is then necessary for the device to effect a connection to the network before transmitting data regarding the accident, including the time, location and vehicle description. This delay problem would be exacerbated with eCall devices using a GPS unit to determine its location, as from a cold start, a GPS unit can take up to twenty minutes to establish a location. In serious accidents, even small delays can be crucial.

Even if the eCall terminals were continually activated in the mobile telecommunications network, and operated in an "idle" mode in the same manner as a conventional mobile handset, a disadvantage of such an arrangement is that it would result in a huge amount of additional network signalling. This problem would be intensified when the vehicles with eCall terminals were moving, as more frequent location area updates would be required due to the movement of the vehicles.

There is therefore a need for an improved eCall facility. There is particularly a need for an eCall facility that can be implemented with a minimal delay.

SUMMARY OF THE INVENTION

According to a first aspect of the present invention, there is provided a mobile terminal configured for use in a mobile telecommunications network, the mobile terminal having an emergency notification facility and an identifier, the identifier usable by the network to recognise the mobile terminal as having the emergency notification facility and to change a system access priority for the terminal, where required.

Preferably the mobile terminal includes a sensing means configured to determine when the mobile terminal is in motion and/or associated with a vehicle and notify the network of such, in order to allow the network to change the system access priority based upon whether or not the terminal is in motion and/or associated with a vehicle.

In this aspect of the invention, a user's mobile terminal is provided with an emergency notification facility, such as eCall and is registered as an "eCall" device with the telecommunications network. From the network's point of view, the network is able to identify all mobile terminals that are eCall enabled, such as by using a database of identifiers of all such mobile terminals. The identifiers may be any suitable unique identification, such as the terminal's MSISDN, IMSI and/or International Mobile Equipment Identity (IMEI).

In another aspect of the present invention, there is provided a mobile telecommunications network element configured to receive a communication from a mobile terminal, the network element being further configured to: determine a terminal identifier from the communication and use the identifier to determine whether the mobile terminal has an emergency notification facility; and where a terminal is determined to have an emergency notification facility, change its system access priority, when required.

Preferably the network element is configured to allocate an access priority that is higher than an access priority given to mobile terminals without an emergency notification facility.

It is also preferable that the network element is further configured to receive a notification of when the mobile terminal is in motion and/or associated with a vehicle, and change the system access priority for the terminal based upon whether or not the terminal is in motion and/or associated with a vehicle. Preferably the network element is configured to change the system access priority to a higher level when the mobile terminal with the emergency notification facility is associated with a vehicle and/or is moving, particularly as compared to other mobile terminals with the emergency notification facility that are not in motion or associated with a vehicle.

A particular advantage of this embodiment is that where only eCall terminals that are in motion/in a vehicle are given a higher priority, the occurrence of an accident can effectively be prepared for in advance of the event. Therefore, this aspect of the invention enables vulnerable eCall devices to be pinpointed by the network and system resources put at the ready for a rapid response in the event of an accident. This can be achieved as a background system task with negligible impact on system resources.

Advantageously, by incorporating the emergency notification facility in a user's mobile handset, the handset is able to provide an eCall facility in vehicles where no eCall device has been fitted (e.g. those manufactured pre 2009). It also allows the eCall facility to be used across various vehicles, rather than just being limited to the one. Further, this aspect of the invention advantageously reduces the need for separate eCall devices to be fitted in all cars.

A further advantage is that the eCall device in the mobile terminal can in effective be active continually by virtue of using the terminals existing idle mode signalling. In this way, eCall functionality can be employed without requiring additional signalling and without unduly increasing the number of devices involved in regular network signalling (e.g. Location Area Updates).

BRIEF DESCRIPTION OF THE DRAWINGS

For a better understanding of the present invention embodiments will now be described by way of example, with reference to the accompanying drawings, in which.

In the drawings like elements are generally designated with the same reference sign.

DETAILED DESCRIPTION OF EMBODIMENT OF THE INVENTION

Figure 1:
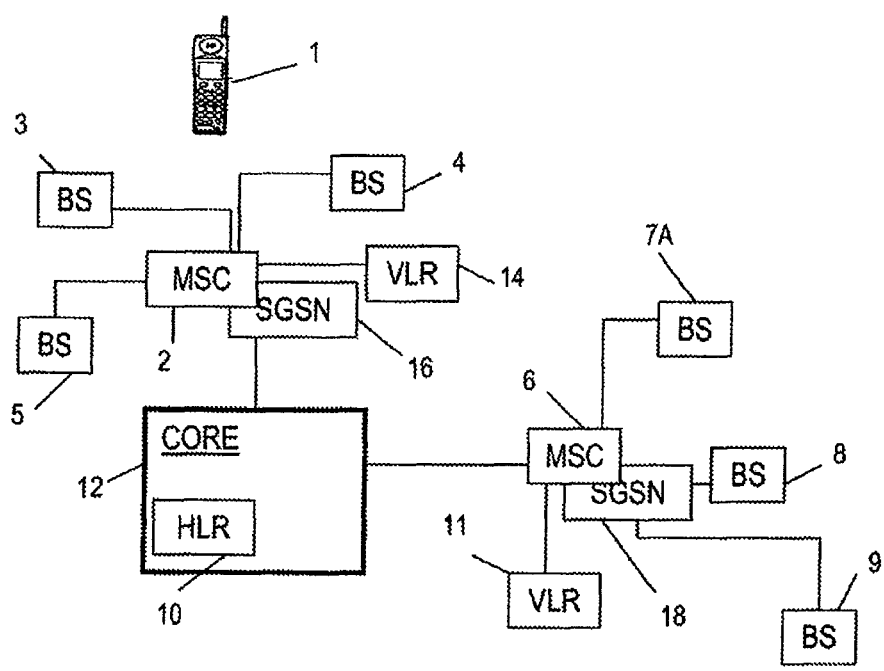
FIG. 1 is a diagrammatic drawing of key elements of a mobile telecommunications network for use in explaining the operation of such a network.

Key elements of a mobile telecommunications network, and its operation, will now briefly be described with reference to FIG. 1.

Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal (or User Entity-UE) is shown at 1. The mobile terminal may be any form of mobile communications device including a handheld mobile telephone, a personal digital assistant (PDA) or a laptop computer (e.g. equipped with a mobile network datacard).

Conventionally, the base stations are arranged in groups and each group of base stations is controlled by one mobile switching centre (MSC), such as MSC 2 for base stations 3, 4 and 5, and MSC 6, which is controlling a further three base stations 7, 8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known generally to the subscriber. The subscriber is issued with a publicly known number, that is, the subscriber's telephone number, by means of which calls to the subscriber are initiated by callers. This number is the MSISDN.

The network includes a home location register (HLR)/home subscriber server (HSS) 10 which, for each subscriber to the network, stores the IMSI and the corresponding MSISDN together with other subscriber data, such as the current or last known MSC and SGSN of the subscriber's mobile terminal. The HLR/HSS is the master database for the network, and while logically it is viewed as one entity, in practice it will typically be made up of several physical databases.

Each of the MSCs of the network (MSC 2 and MSC 6) has a respective VLR (14 and 11) associated with it and which stores subscriber data, typically retrieved from the HLR, when the subscriber activates a mobile terminal in one of the cells corresponding to one of the base stations controlled by that MSC.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLR for the packet switched domain. The SGSNs communicate with a Gateway GPRS Support Node (GGSN) (not shown) to support IP-based communications with other entities.

From the description above, it will be understood that the coverage area of a mobile telecommunications network is divided into a plurality of cells, each of which is served by a respective base station. In order to allow a mobile terminal to maintain a call when the mobile terminal moves outside the coverage area of a cell, the call must be switched to an alternative cell automatically. The HLR is updated each time a mobile terminal moves from the coverage area of one MSC to another MSC and from one SGSN to another SGSN.

The coverage area of the mobile telecommunications network is divided into a plurality of location areas (LAs) and into a plurality of routing areas (RAs) to simplify paging and the like.

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area (LAI). The mobile terminal uses this data to determine when it has moved into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location area update (LAU). If the MSC/VLR is the same for the new and old location areas, the network can immediately authenticate the mobile terminal and note the change of location area. However, if the mobile terminal is moved to a different MSC/VLR, the MSC/VLR addresses a message to the HSS/HLR. The HSS/HLR notes the new location and downloads security parameters to allow the network to authenticate the mobile. It also passes on subscription details of the user to the new VLR and informs the old VLR to delete its records.

In the packet-switched domain, a routing area operates in the same manner as the location area of the circuit-switched domain, except communications are through the SGSN, rather than the MSC.

With this background in mind, a first embodiment of the invention will be described with reference to FIG. 2.

Figure 2:
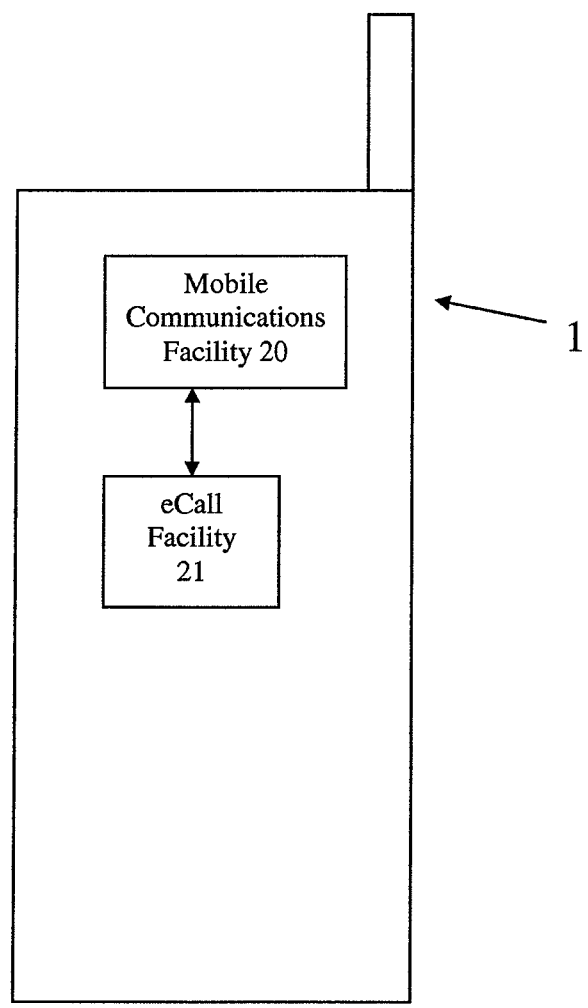
FIG. 2 illustrates a mobile terminal according to an embodiment of the invention.

FIG. 2 illustrates a schematic diagram of a mobile terminal 1 according to an embodiment of the invention. The terminal 1 includes mobile communication means 20 to operate in a telecommunications network, such as just described. This mobile communication means may be implemented in hardware and/or software.

In addition, the mobile terminal includes means 21 for implementing an emergency notification facility, such as eCall, the operation of which has been described above. The emergency notification facility means may also be implemented in hardware and/or software.

Where the mobile terminal is in idle mode it will register with or "camp on" an adjacent base station, typically its nearest base station 4. To register with the adjacent base station 4, the mobile terminal will gain access to a radio channel and transmit its identity to the base station 4. Upon receiving the communication, the base station 4 will check if it has temporarily stored subscriber data for the terminal (i.e. where previously obtained from MSC 2), and if not, as is typical, it will request the information from its MSC 2, and acknowledge the terminal's registration request. The terminal will then store the identity of the base station 4 on its SIM, and use this data, together with data broadcast by neighbouring cells 3, 5 to determine when it has moved to a new location area.

According to an important aspect of this embodiment, from the MSC's point of view, upon receiving the registration request regarding the terminal 1, the MSC 2 will also determine whether the terminal has an emergency notification facility. This may be achieved from a unique identifier of the terminal, such as may be transmitted by the terminal in its registration request. This unique identifier may be the SIM's IMSI, the terminal's IMEI or the subscriber's MSISDN.

The MSC, in this regard, may have access to a list of IMSI, IMEI and/or MSIDSDN that are uniquely associated with a terminal having the emergency notification facility.

Alternatively, the terminal's subscriber data in the HLR may have a terminal type identifier (TTID), such as a flag to indicate that the terminal is an "eCall" terminal. This information can be determined off-line and the result stored in the HLR, and copied to the relevant VLR as the terminal moves around the network.

Upon the MSC receiving the terminal's subscriber data and storing it in its VLR, the MSC will note that the terminal 1 has an emergency notification facility, and thereafter interact with it accordingly. For example, the TTID set to "eCall" could serve as an indication for the serving BS/MSC to monitor the terminal for movement. The movement detection may be achieved by various means, including by observing LAUs of the terminal, using GPS, triangulation or receiving a notification when movement occurs from the mobile terminal itself or a separate network element. In particular, where changes in cell ID occur at an appropriate rate, then this would be a good indication that the terminal is in motion.

Where GPS is utilized, the MSC/BS could periodically interrogate the terminal requesting GPS data there-from and determine movement through periodic changes of position. Similarly, where triangulation is utilized, the MSC/BS could use signal strength measurements of neighbouring base stations, provided by the terminal, and perform and compare the different measurements to determine if the terminal is moving, and also possibly the speed with which the terminal is moving. In this regard, a speed threshold may be applied to ensure that the degree of movement is not negligible.

Alternatively, or in addition to determining whether the terminal is actually in motion, the MSC may determine whether the terminal is likely to be in motion. This may be implemented by using short range communication technologies such as near field communication (NFC), Bluetooth or a proximity box, associated with a vehicle in order to be able to determine when the terminal is likely to be in, and carried by the vehicle.

For example, where the terminal is NFC-enabled, then the terminal can be associated with the vehicle by a reader in the vehicle detecting the terminal's NFC card/component (or vice versa). A typical example of this would be a bus where NFC ticketing is in place. The terminal can then be associated/disassociated from the vehicle by swiping the terminal upon entry and exit respectively. Other disassociation approaches are possible, such as upon the expiration of a pre-determined period of time.

The association of the terminal with the transport vehicle can be made in the network by a wireless notification signal being sent from the mobile terminal as a result of the NFC swipe. Alternatively, a signal may be sent by the NFC system on the vehicle.

In the proximity box example, the proximity box is configured to interrogate the mobile terminal in order to determine a terminal ID, such as the IMSI, IMEI and/or MSISDN. This ID can then be forwarded to the network to inform it of the proximity of the terminal. The proximity box is preferably configured to undertake the interrogation using normal standards-defined call set-up signals.

In the Bluetooth example, it may be determined that the terminal is associated with a vehicle when a car hands free set is plugged into the terminal which then communications with a Bluetooth component of the vehicle, such as for directing received speech to the vehicle's speakers. The terminal may be configured to recognize this occurrence and communicate the event to the network. Alternatively, the vehicle may communicate the association to the network.

An intelligent component of a vehicle may also determine that a particular terminal is associated with it when the terminal is connected to an in-vehicle car charger.

The determination of whether the terminal is moving, or associated with a vehicle, can be used in order to provide the eCall-enabled terminal with a higher network access class level.

In this regard, access classes are used in GSM and UMTS networks to regulate or limit access to the network, such as for congestion control or prioritisation of emergency services. There are currently fifteen levels of priority in the mobile network. Levels 0 to 9 are randomly assigned to conventional mobile terminals and are all treated equally. The allocated class is stored in the terminal's SIM as part of the SIM personalisation process. Priority level 10 is allocated to any call made to an emergency number, such as 999 or 112. Priority levels 11 to 14 are allocated to the network operator, security services, public services and emergency services respectively. Priority level 15 is for use by network staff. In a situation where the network is overloaded, such as an emergency situation, the network operator can disable any of the priority levels 1 to 9 to remove at least a proportion of the ordinary users and thereby ease congestion.

The network continually broadcasts the current authorized access classes in each cell. New call attempts can be limited, or completely denied, by adjusting the authorized access classes. For example, forbidding class 0 will remove access privileges from about 10% of the subscribers.

To provide an e-Call enabled terminal with a greater priority, it may be given a class 10 priority level (or higher) in order to ensure that the eCall terminal has a higher priority in an emergency situation.

For instance, where the network confers eCall-enabled terminals that are in mation/associated with a vehicle with a higher priority, where the MSC has the "eCall" flag set, and is then notified of the movement/in vehicle situation of the terminal, the higher priority level may be allocated. To implement this feature, the network may utilize an "in motion" flag. Alternatively, the network could maintain a list of eCall enabled terminals known to be in motion/in a vehicle. This list could be stored, together with the last known cell ID, at an appropriate MSC and used to give priority to eCalls from the listed terminals. In this way, a higher priority level can be provided in a similar manner as the existing Access class feature.

Preferably movement of the terminal, or its association with a vehicle, continues to be monitored even once the priority level of the eCall-enabled terminal is raised. In this way, once it is determined that the terminal is no longer moving (preferably for at least a predetermined duration in order to account for temporary stops) or is no longer associated with a vehicle, then the normal priority level of the terminal can be reverted to, such as by clearing the "in motion" flag of the VLR/HLR, or removing it from the priority list, thus releasing system resources.

In an alternative embodiment, the higher priority level is allocated to all eCall-enabled terminals, whether in motion or not, but only in relation to emergency communications.

To summarise, the following Table 1 illustrates various scenarios for mobile terminals and the priority level that would apply:

TABLE 1

| eCall enabled? | In motion? | Priority Level allocated |
|---|---|---|
| No | n/a | 1-9 |
| Yes | n/a | >=10 |
| Yes | No | 1-9 |
| Yes | Yes | >=10 |

The first two table entries relate to eCall terminals that are given a higher priority merely by virtue of being eCall terminals, regardless of whether in motion. The last two table entries relate to terminals that are only given a higher priority when they are eCall terminals and in motion/in a vehicle.

In a further alternative, rather than using an existing priority level (e.g. 10) for eCall enabled devices, a new priority level 10e could be defined and allocated to terminals listed as eCall enabled and/or known to be in motion/in a vehicle. If congestion occurs during a major incident, due to a high number of calls to the emergency numbers 999 or 112 and having priority level 10, then calls with priority 10e could be given precedence over calls with priority level 10.

In a further refinement, there may be sub-classes within the 10e category to allow finer control of priorities, particularly during the congestion that would result following a major incident. This could be used to distinguish between eCall devices not in motion and eCall devices known to be in motion, or other uses as experience dictates.

By allocating a higher priority level to eCall terminals, particularly eCall terminals that are in motion, or in a vehicle, the mobile telecommunication system resources are effectively pre-allocated to the relevant terminals in advance of any incident that may occur (and which is more likely in a moving vehicle), thereby ensuring a better system response and better handling of an incident such as a crash. Further, it allows call congestion control to be implemented if high numbers of emergency calls are occurring simultaneously, such that eCall devices that are in motion placing an eCall are given priority over other devices.

The time spent in normal vehicle travel is far greater than the time spent in crashes, so the motion detector is ideally a background system task with negligible impact on system resources.

Further, in order to minimize repetition of accident events, once an eCall has been processed from a given terminal, then the normal priority level of the terminal can be reverted to, such as by clearing the "in motion" flag of the VLR/HLR, or marking its entry in the list so that repeat eCall attempts from the same terminal are no longer given a higher priority. Similarly, where the eCall terminal had previously been allocated a class 10 or higher priority level such as 10e, this level could be revoked once a first eCall is made.

To implement the eCall facility on a mobile terminal, in-car sensors may be utilized to communicate an event, such as an accident to the mobile terminal. Alternatively the mobile terminal may include its own sensor for determining the occurrence of the event.

Upon receiving such a notification or determining the event occurrence, the mobile terminal is configured to effect an emergency call automatically to an emergency call centre. That is, the emergency notification facility will extract a predetermined eCall number to call and initiate the call. Advantageously the mobile terminal will be active and in direct communication with the network. Therefore the emergency call can be implemented virtually instantaneously.

Should the terminal be involved in a standard call at the time of the accident, the terminal is configured, upon receiving the accident notification, to override the standard call and place the call to the emergency call centre.

When the call is placed to the emergency call centre, the terminal will transmit a minimum set of data (MSD), which typically includes the time, location and vehicle description. In this regard, the location can be determined either by the network or the terminal itself, using various techniques including GPS, triangulation using data relating to neighbouring cell IDs or even just based on the terminal's serving cell ID.

It is to be appreciated that in these embodiments of the invention it is ideally only emergency calls that are given a higher priority when the eCall terminal has been provided with a higher priority level. Therefore, for example, should the user of an eCall-enabled terminal make a normal call, this call will be dealt with in the usual manner, without the call receiving priority treatment.

The embodiments of the invention have been described in relation to a GSM/UMTS communication network, however the principles may readily be applied to other network configurations, including the proposed 3GPP LTE (Long Term Evolution) network, which is not yet implemented. In this regard, the VLR and MSC would be replaced by a HSS and Mobility Management Entity (MME).

The embodiments of the invention have also been described in relation to the emergency notification facility being implemented in hardware and/or software on the mobile terminal itself. According to an alternative embodiment of the invention, the emergency notification facility is implemented on a device that can be associated with the mobile terminal, such as on a SIM, so that the emergency notification facility is intrinsically linked to the SIM's IMSI and MSISDN.

The embodiments of the invention have been generally described as being implemented by an MSC, however any network element may be utilized, including a newly introduced network element, that communicates, for example with the network via the MSC.

The preferred embodiments have also been generally described in relation to an eCall enabled mobile terminal being given a higher priority when moving and/or associated with a vehicle. Whilst this is an advantageous feature, it is not an essential feature, and the eCall enabled terminal may be given a higher priority in other circumstances, such as when located in a particular area or at a particular time of day, or merely by virtue of having an eCall facility.

The embodiments have also been described in relation to the network identifying an eCall terminal and setting a TTID to indicate the eCall facility. In an alternative embodiment, this TTID is already set by the core network (e.g. predefined in the HLR/HSS' subscriber details) and other network elements (e.g. the MSC) use this indication to know to monitor the terminal for movement/association with a vehicle and to change the terminal's system access priority accordingly.

The invention claimed is:

1. A mobile terminal configured for use in a mobile telecommunications network, the mobile terminal having an emergency notification facility and an identifier, the identifier having an identification number being stored onto a SIM card of the mobile terminal, the identifier usable by the network to recognise the mobile terminal as having the emergency notification facility and to change a system access priority for the terminal, where required, wherein the mobile terminal further includes a sensing means configured to determine when the mobile terminal is in motion and/or associated with a vehicle and a notifying means configured to notify the network of such, in order to allow the network to change the system access priority based upon whether or not the terminal is in motion and/or associated with a vehicle.

2. A mobile telecommunications network element configured to receive a communication from a mobile terminal, the network element being further configured to:
determine a terminal identifier from the communication and use the identifier to determine whether the mobile terminal has an emergency notification facility, the terminal identifier having an identification number being stored onto a SIM card of the mobile terminal;
where a terminal is determined to have an emergency notification facility, change its system access priority, when required; and
to receive a notification of when the mobile terminal is in motion and/or associated with a vehicle, and change the system access priority for the terminal based upon whether or not the terminal is in motion and/or associated with a vehicle.

3. The network element of claim 2 which is configured to set a flag in a Home Location Register and/or Visitor Location Register upon receiving a notification of the mobile terminal being in motion and/or associated with a vehicle, such that when the flag is set the terminal's system access priority is changed.

4. The network element of claim 3, further configured to receive a notification of when the mobile terminal is not in motion and/or not associated with a vehicle, and reset the flag, if the flag had previously been set.

5. The network element of claim 3 wherein the network element is configured to receive the information regarding the terminal's association with a vehicle from a communication from the mobile terminal.

6. The network element claim 3 wherein the network element is configured to receive the information regarding whether the terminal is moving from one or more network base stations.

7. The network element of claim 3 wherein the network element further includes a list of terminals which are to be given a high priority if an emergency call is received from any such terminal.

8. A method of operating a mobile or cellular telecommunications network with which a plurality of telecommunications terminals are registered which have an emergency notification facility, the terminals being operable to signal their emergency facility status to the network for facilitating terminal prioritization by the network, wherein each terminal is provided with an identifier, the identifier having an identification number being stored onto a SIM card of the mobile terminal, that is indicative of their emergency notification facility, the method including controlling the interaction between the network and the terminal in dependence upon the identifier upon the terminal initiating a call to an emergency number, and controlling the interaction between the network and the terminal by changing a system access priority for the particular mobile terminal based upon whether or not that particular mobile terminal is determined to be in motion and/or associated with a vehicle.

9. In a telecommunications network including a network element configured to distinguish between eCall-enabled mobile terminals and other mobile terminals, a method of allocating a system access priority to the eCall-enabled mobile terminals comprising:
upon determining a particular mobile terminal to be e-Call enabled, marking a first network flag to indicate such;
upon determining the particular mobile terminal to be in motion and/or associated with a vehicle, marking a second network flag to indicate such.

10. The method of claim 9 further including, upon noting the second network flag as indicating the mobile terminal to be in motion and/or associated with a vehicle, the core network allocating a higher access class level to the terminal, such that the access class level is higher than that normally allocated to the terminal.

11. A mobile terminal configured for use in a mobile telecommunications network, the mobile terminal having an emergency notification facility and an identifier, the identifier having an identification number being stored onto a SIM card of the mobile terminal, the identifier usable by the network to recognise the mobile terminal as having the emergency notification facility and to change a system access priority for the terminal, where required,
wherein the mobile terminal further includes a sensing means configured to determine when the mobile terminal is in motion and/or associated with a vehicle and a notifying means configured to notify the network of such, in order to allow the network to change the system access priority based upon whether or not the terminal is in motion and/or associated with a vehicle,
wherein a mobile telecommunications network element is configured to receive a communication from the mobile terminal, the network element being further configured to set a flag in a Home Location Register and/or Visitor Location Register upon receiving a notification of the mobile terminal being in motion and/or associated with a vehicle, such that when the flag is set the terminal's system access priority is changed.

12. A mobile telecommunications network element configured to receive a communication from a mobile terminal, the network element being further configured to:
determine a terminal identifier from the communication and use the identifier to determine whether the mobile terminal has an emergency notification facility, the terminal identifier having an identification number being stored onto a SIM card of the mobile terminal;
where a terminal is determined to have an emergency notification facility, change its system access priority, when required;
to receive a notification of when the mobile terminal is in motion and/or associated with a vehicle, and change the system access priority for the terminal based upon whether or not the terminal is in motion and/or associated with a vehicle; and
to set a flag in a Home Location Register and/or Visitor Location Register upon receiving a notification of the mobile terminal being in motion and/or associated with a vehicle, such that when the flag is set the terminal's system access priority is changed.

13. A method of operating a mobile or cellular telecommunications network with which a plurality of telecommunications terminals are registered which have an emergency notification facility, the terminals being operable to signal their emergency facility status to the network for facilitating terminal prioritization by the network, wherein each terminal is provided with an identifier, the identifier having an identification number being stored onto a SIM card of the mobile terminal, that is indicative of their emergency notification facility, the method including controlling the interaction between the network and the terminal in dependence upon the identifier upon the terminal initiating a call to an emergency number, and controlling the interaction between the network and the terminal by changing a system access priority for the particular mobile terminal based upon whether or not that particular mobile terminal is determined to be in motion and/or associated with a vehicle, wherein a mobile telecommunications network element is configured to receive a communication from the mobile terminal, the network element being further configured to set a flag in a Home Location Register and/or Visitor Location Register upon receiving a notification of the mobile terminal being in motion and/or associated with a vehicle, such that when the flag is set the terminal's system access priority is changed.

* * * * *